(12) United States Patent
Axelsson et al.

(10) Patent No.: US 8,375,411 B2
(45) Date of Patent: Feb. 12, 2013

(54) CROSS-DEVICE SHARING OF REMINDERS

(75) Inventors: Karin Axelsson, Linköping (SE);
Marcus Bernhardson, Linköping (SE);
Conny Forsander, Linköping (SE);
Fredrik Paulsson, Linköping (SE)

(73) Assignee: Nokia Corporation, Espoo (FI)

( * ) Notice: Subject to any disclaimer, the term of this patent is extended or adjusted under 35 U.S.C. 154(b) by 2522 days.

(21) Appl. No.: 09/891,380

(22) Filed: Jun. 27, 2001

(65) Prior Publication Data

US 2003/0005448 A1 Jan. 2, 2003

(51) Int. Cl.
*H04N 5/76* (2006.01)
*H04N 5/445* (2011.01)
*G06F 3/00* (2006.01)
*G06F 13/00* (2006.01)

(52) U.S. Cl. .......... 725/58; 386/299; 386/291; 386/292; 386/293; 386/297

(58) Field of Classification Search .................... 725/58; 386/292, 291, 296, 293, 299
See application file for complete search history.

(56) References Cited

U.S. PATENT DOCUMENTS

| | | | | |
|---|---|---|---|---|
| 5,805,763 A | | 9/1998 | Lawler et al. ................... 386/83 |
| 6,104,334 A | * | 8/2000 | Allport ........................ 341/175 |
| 6,130,726 A | * | 10/2000 | Darbee et al. ................. 348/734 |
| 6,177,931 B1 | * | 1/2001 | Alexander et al. .............. 725/52 |
| 6,424,828 B1 | * | 7/2002 | Collins et al. ............. 455/412.1 |
| 6,754,904 B1 | * | 6/2004 | Cooper et al. ................. 725/32 |
| 6,771,949 B1 | * | 8/2004 | Corliss .......................... 455/413 |
| 6,813,775 B1 | * | 11/2004 | Finseth et al. .................. 725/46 |
| 2003/0023504 A1 | * | 1/2003 | Berenson et al. .............. 705/26 |
| 2004/0008972 A1 | * | 1/2004 | Haken ............................. 386/83 |
| 2006/0031883 A1 | * | 2/2006 | Ellis et al. ....................... 725/58 |
| 2006/0190966 A1 | * | 8/2006 | McKissick et al. ............. 725/61 |
| 2007/0277201 A1 | * | 11/2007 | Wong et al. ..................... 725/40 |

FOREIGN PATENT DOCUMENTS

| | | |
|---|---|---|
| EP | 1 051 019 A2 | 11/2000 |
| EP | 1195990 | 4/2002 |
| WO | 9929109 | 6/1999 |
| WO | 0040028 | 7/2000 |

OTHER PUBLICATIONS

European Office Action for corresponding EP Application No. 02 726 393.8-2202, Dec. 9, 2009, Europe.

* cited by examiner

*Primary Examiner* — Pankaj Kumar
*Assistant Examiner* — Usha Raman
(74) *Attorney, Agent, or Firm* — Diithavong Mori & Steiner, P.C.

(57) ABSTRACT

The present invention provides an electronic program guide system comprising: receiving means for receiving at least one electronic program guide corresponding to a broadcast program; selecting means for selecting a desired program from said electronic program guide; notification means for creating a notification for the program selected from said electronic program guide; communication means for access to a communications network; transmission means for transmitting a notification of the program selected from said electronic program guide to at least one remote electronic program guide system using said communications network; and reception means for receiving a notification from a remote electronic program guide system.

26 Claims, 4 Drawing Sheets

CROSS-DEVICE SHARING OF REMINDERS

BACKGROUND

1. Field of Invention

The present invention generally relates to an electronic program guide system and a method therefor. More particularly it relates to an electronic program guide system and a method for notification of programs to a friend or other persons.

2. Description of the Prior Art

Many magazines, newspapers, and other publications have built their readership around the growing market of television (TV) viewers, who desire TV program information. Many cable TV networks have even designated a TV channel for providing the date, time and channel, at which TV programs will be presented.

An expedient presentation of TV program information is obtained by an electronic program guide (EPG). In an EPG it is possible to browse, in a simple manner, a multitude of programs provided from a multitude of TV channels.

An electronic program guide is an application provided in an apparatus such as an integrated receiver decoder (IRD) a set-top box (STB), or television receiver, designed to aid a viewer in the navigation of and selection from broadcast services in a digital television system. By means of the EPG it is possible to control the functionality of the apparatus, such as tuning to, or scheduling a recording of a specific service. It is also possible to register reminders and planned recordings as well as to filter the large amount of information available through the EPG. It is even possible to create a "virtual" channel comprising programs from different channels, as is described in the international publication WO 0040028.

A program recording system allowing a user of an interactive viewing system, such as EPG, to record a selected program or to set a reminder for a selected program is described in U.S. Pat. No. 5,805,763.

A drawback with a reminder/recording system as described in U.S. Pat. No. 5,805,763 or WO 0040028 is that if a user would like to inform a friend or other persons of an interesting program, the user needs to remember or note down characteristic reminding/recording details for that program and give those details to the friend, who also has to remember or note down characteristic reminding/recording details.

SUMMARY OF THE INVENTION

An object of the present invention is to provide an electronic program guide system that overcomes the above-mentioned drawback.

Another object of the present invention is to provide a method that overcomes the above-mentioned drawback.

Yet another object of the present invention is to provide a computer program product that overcomes the above-mentioned drawback.

These objects, among others, are according to the present invention attained by systems, methods and computer program products, respectively, as defined in the appended claims.

By providing an electronic program guide system, comprising: receiving means for receiving at least one electronic program guide corresponding to a broadcast program; selecting means for selecting a desired program from said electronic program guide; notification means for creating a notification for the program selected from said electronic program guide; communication means for access to a communications network; transmission means for transmitting a notification of the program selected from said electronic program guide to at least one remote electronic program guide system using said communications network; and reception means for receiving a notification from a remote electronic program guide system, a friend may be notified of an interesting program without having to remember or note down characteristic reminding/recording details for that program.

By providing a method for providing notifications of a program selected from an electronic program guide system comprising the steps of: browsing the electronic program guide for identification of a program of interest; selecting a desired program from said electronic program guide; creating a notification of the program selected from said electronic program guide; transmitting the notification of the program selected from said electronic program guide to at least one remote electronic program guide system, a friend may be notified of an interesting program without having to remember or note down characteristic reminding/recording details for that program.

By providing a computer program product stored on a computer readable storage medium, comprising computer readable program code means for causing a computer to perform the following steps: providing an electronic program guide for identification of a program of interest; providing selection options for a desired program from said electronic program guide; creating a notification of the program selected from said electronic program guide; and obtaining transmission of the notification of the program selected from said electronic program guide to at least one remote electronic program guide system, the method is easily implemented in an electronic program guide system as described above.

By providing a computer program directly loadable into the internal memory of a digital computer comprising software code portions for performing the following steps when said product is run on a computer providing an electronic program guide for identification of a program of interest; providing selection options for a desired program from said electronic program guide; creating a notification of the program selected from said. electronic program guide; and obtaining transmission of the notification of the program selected from said electronic program guide to at least one remote electronic program guide system, the method is easily implemented in a multimedia system as described above.

Further features and advantages of the present invention will be evident from the following description.

BRIEF DESCRIPTION OF THE DRAWINGS

The present invention will become more fully understood from the detailed description of preferred embodiment given below and the accompanying figures, which are given by way of illustration only, and thus, are not limitative of the present invention, wherein.

DETAILED DESCRIPTION OF PREFERRED EMBODIMENT

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

A first embodiment of the present invention will now be described with reference to FIGS. 1-3.

Figure 1:
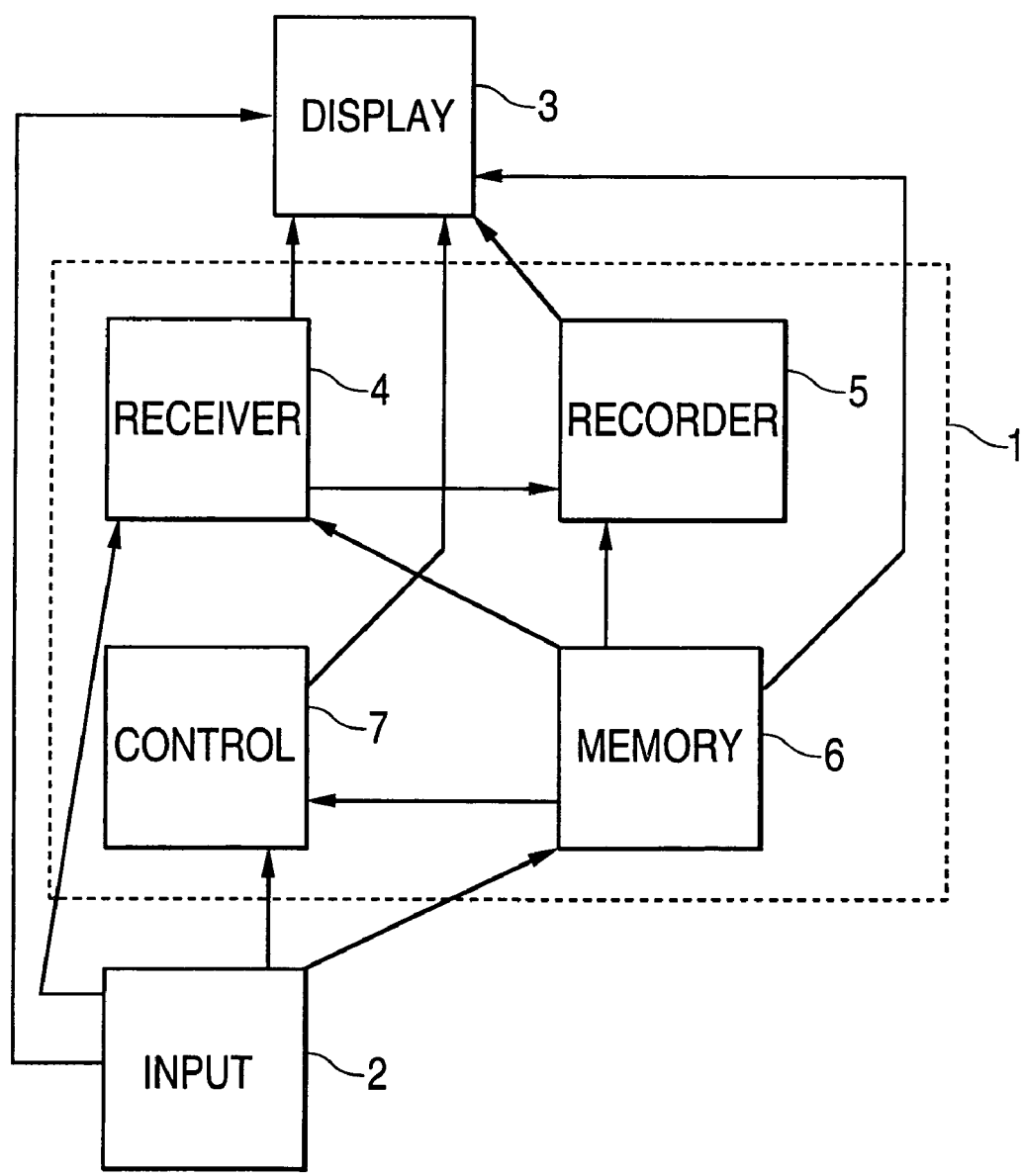
FIG. 1 schematically shows a multimedia system according to the present invention.

A multimedia system, as shown in FIG. 1, comprises an electronic program guide system 1. for example, incorporated in an integrated receiver decoder, a user input means 2, such as a remote control, and a display device 3, such as a TV set. The electronic program guide system 1 comprises a receiving means 4, such as a tuner/receiver, a recording device 5, such as a hard disk, an electronic program guide (EPG) memory 6, and a control device 7 including a communications means, such as a network modem.

The electronic program guide system 1 is controlled by the remote control 2. The remote control 2 may further control the TV set 3.

The tuner/receiver 4 receives broadcast programs, e.g. broadcast via cable, terrestrial or satellite, which programs may be watched on the TV set 3 and/or recorded on the hard disk 5. The tuner/receiver 4 further receives updates for the EPG, which are transferred to the EPG memory 6, regularly or upon request.

Figure 2:
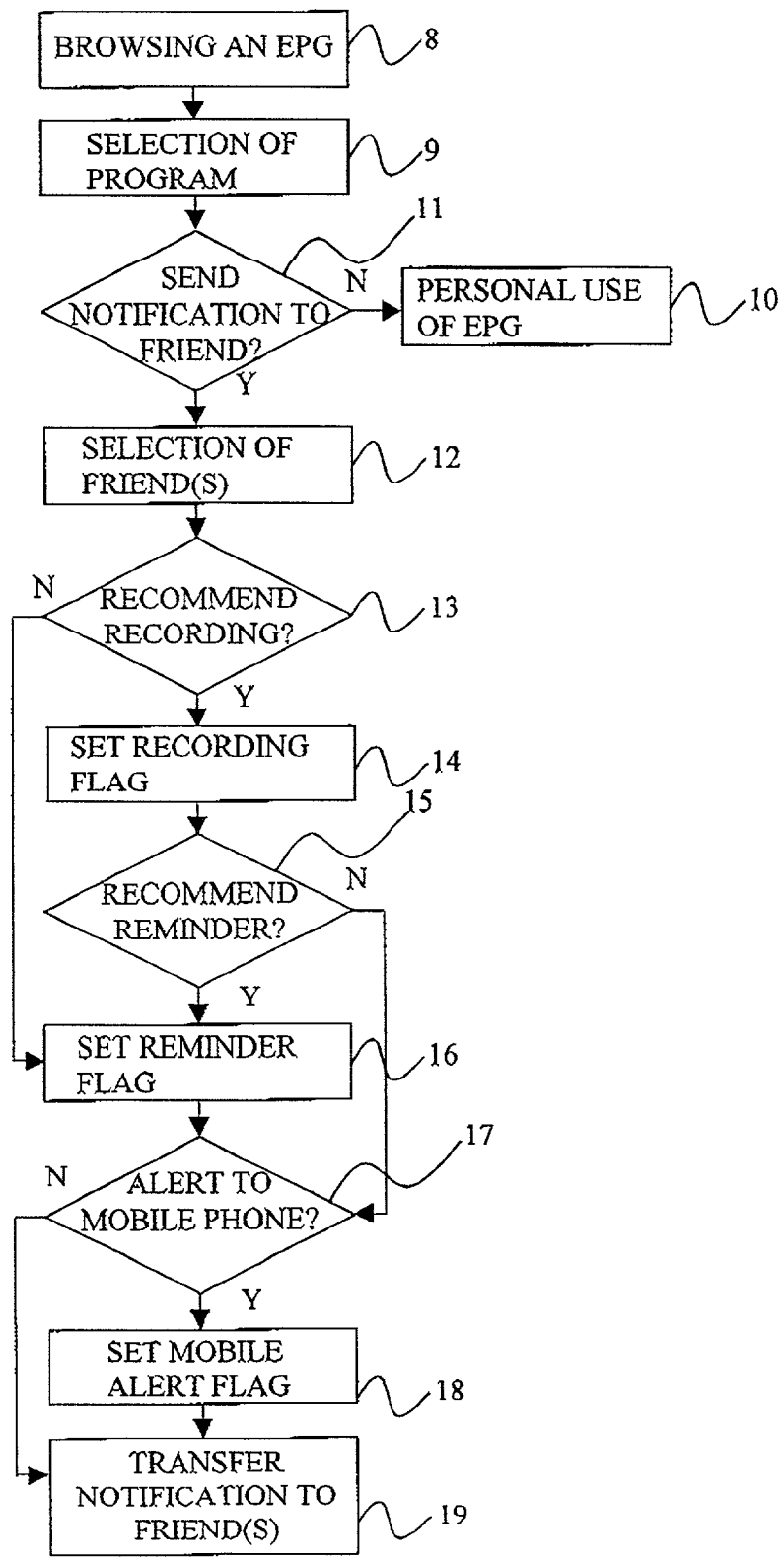
FIG. 2 shows a flow chart for transmission to a notification according to the present invention.

Referring to FIG. 2, the EPG displays available programs from available TV channels or own compositions, that is virtual channels, on the TV set 3. The EPG is browsed 8 to find a program of interest, which program then is selected 9. The selected program may be personally used 10, such as displayed on the TV set 3 or recorded on the hard disk 5. It is further possible to set a reminder that displays a message on the TV set 3 at a predetermined time, for example, a couple of minutes, before the program starts or sends an alert message, in the form of an SMS (SMS, short message service), to a mobile telephone a predetermined time, for example, at least ten minutes, before the program starts. An alert message is of small size and easily fit into an SMS. A reminder may alternatively be sent both to the TV 3 and to a mobile telephone (not shown).

A notification of the selected program in the EPG may alternatively 11 be transmitted to one or more persons, such as a friend or a multitude of friends, that is to their respective electronic program guide system. The friend or friends that the user wants to notify are selected 12, either in response to a message displayed on the TV set 3 or by activation of a dedicated button. If the user wants to recommend recording 13 a recoding flag is set 14 in the notification. If the user also wants to recommend reminder 15 a reminder flag is set 16 in the notification, when the user does not want to recommend recording 13 at least the reminder flag is set 16, that is when recommend recording 15 is dropped a reminder flag is set 16. Further, if the user wants to send an alert message 17 to the friend or friends an alert flag is set 18 in the notification.

The notification is thereafter coded and transmitted 19, by the network modem of the control device 7, to the electronic program guide system(s) of the friend(s). The transfer of the notification is accomplished with a particular protocol that conforms to TCP/IP (TCP/IP, transmission control protocol/internet protocol). Thus, the notification contains indications for a reminder to a program, a record instruction f or a program, or both a reminder and a record instruction for a program, and optionally an alert message.

The control device 7 of the electronic program guide system 1 further includes reception means, such as a filter. The filter is set to pass only notifications from certain friends, authorized by, for example, a certificate. Different friends may have different access levels, defined by the authorization.

Figure 3A:
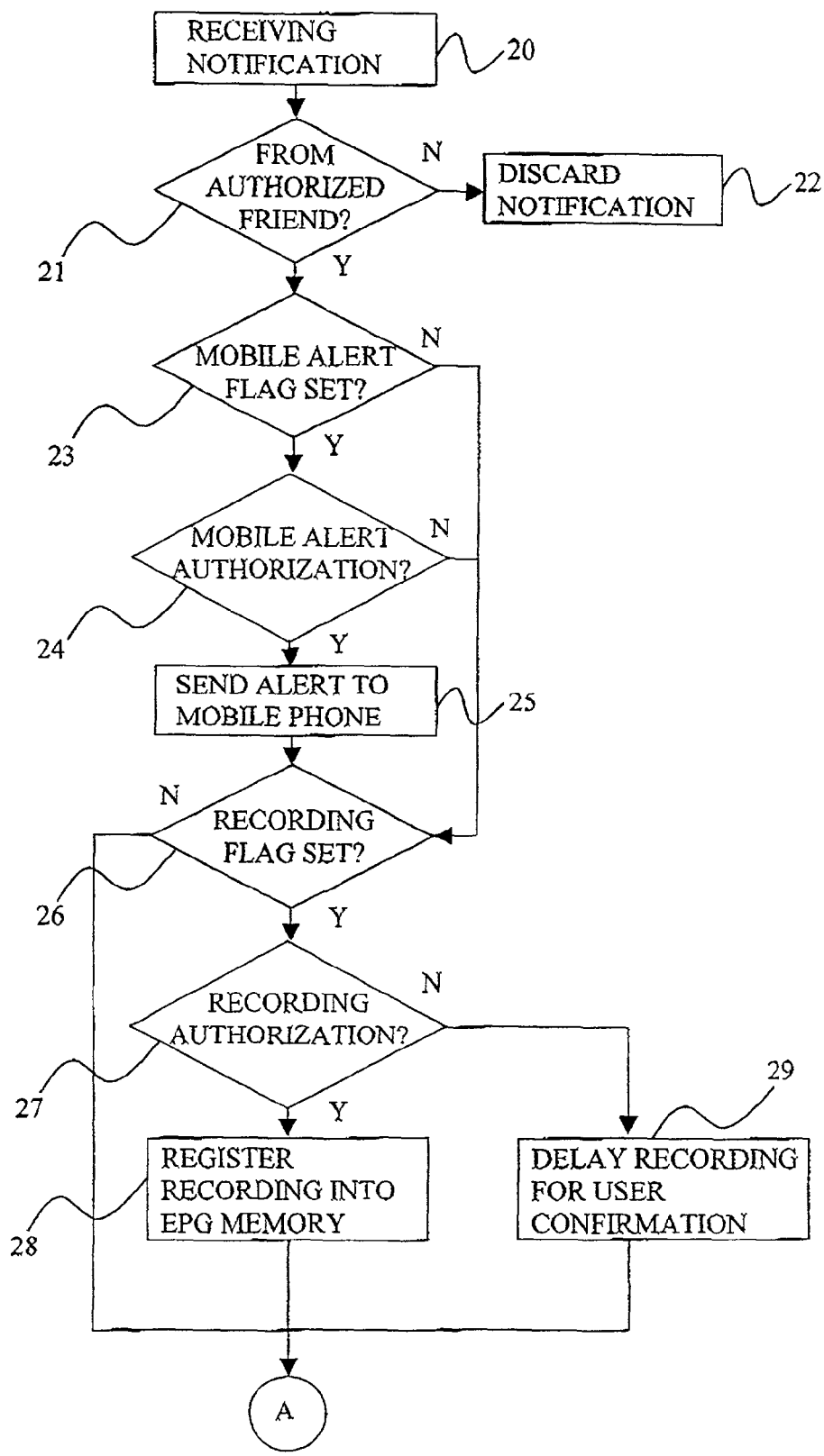
FIGS. 3a and 3b show a flow chart, split into two pages, for managing reception of a notification according to the present invention.
Figure 3B:
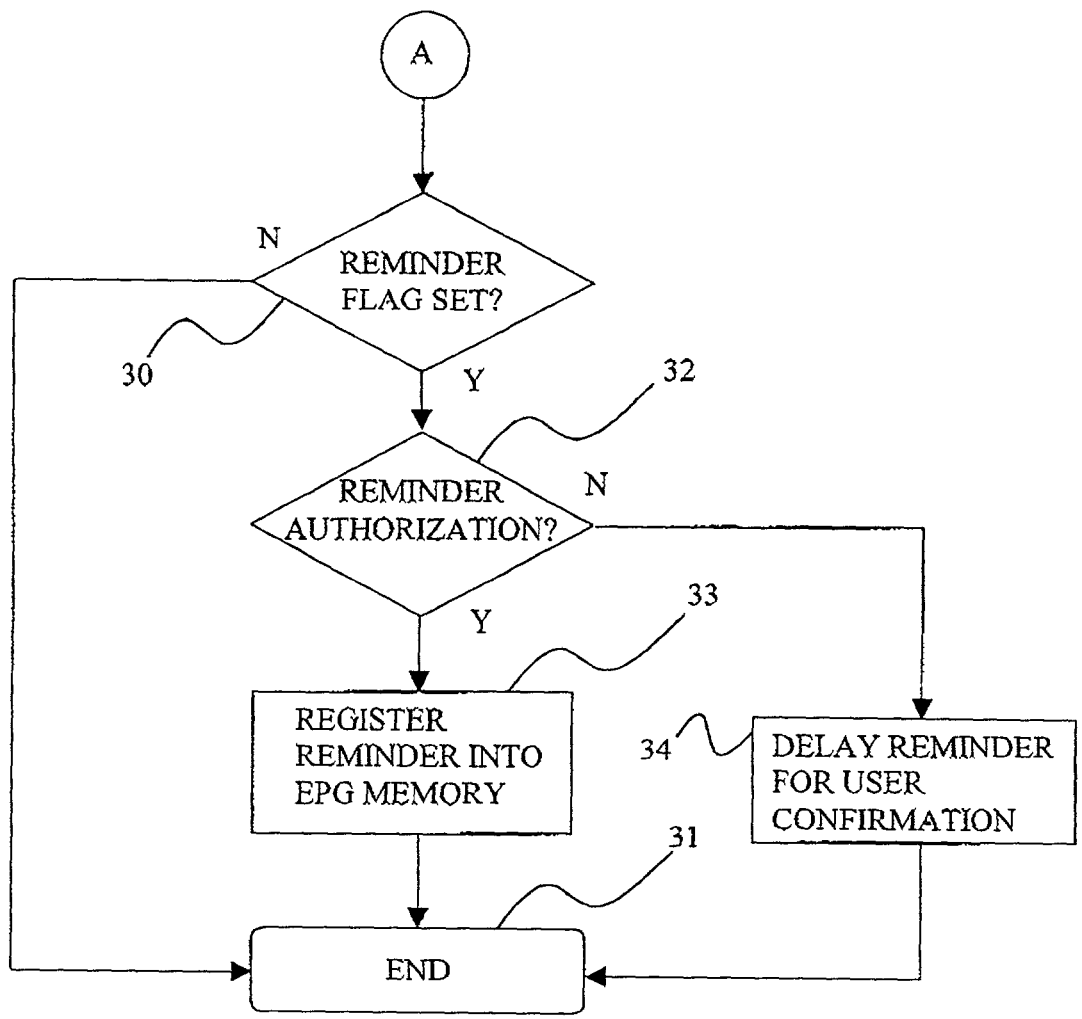

Referring to FIGS. 3a and 3b, a notification is received 20 in the electronic program guide system 1 by the network modem of the control device 7 and decoded. If the notification is not from an authorized friend 21, it is discarded 22. If the notification is authorized, it is checked 23 if it contains a mobile alert flag set. When an alert flag is set, it is checked 24 if the friend is authorized to send an alert message to a mobile phone of the user. If so, an alert message is sent 25 to the mobile phone by SMS as described above. If not, and also if no mobile alert flag is set, it is checked 26 if a recording flag is set. When a recording flag is set it is checked 27 if the friend is authorized to register a recording. If the friend is authorized, the recording is registered in the EPG memory 6. This may be valuable when the user is away from home, for example, on holiday, to allow a friend to look after interesting programs. If the present recording registration is in conflict with a previous recording instruction, the previous recording instruction is transferred to a reminder. If the user is not authorized to register a recording instruction, the instruction is delayed 29 until the user either confirms or cancels that recording instruction.

Lastly, it is checked 30 if a reminder flag is set. If no reminder flag is set, management of the notification is ended 31. If a reminder flag is set, it is checked 32 if the notification is authorized to set a reminder. If the notification is authorized the reminder is registered 33 into the EPG memory 6 and then management of the notification is ended 31. If the notification is not authorized to register a reminder, the reminder registration is delayed 34 until the user either confirms or cancels that reminder registration.

A second embodiment of the present invention will next be described.

The second embodiment is identical to the first embodiment except for the differences mentioned below.

The electronic program guide system may be incorporated in a set-top box, a mobile handset, a television receiver or a mobile display appliance.

The alert flag in the notification may be in forms closely related to SMS, such as EMS (EMS, enhanced messaging service), or other mobile messaging systems such as MMS (MMS, multimedia messaging service) or in the form of an electronic mail to the mobile phone or other email address. The alert flag in the notification may alternatively be replaced by an alert message transmitted directly to a mobile phone of the friend or friends, for example, by SMS, MMS, EMS or electronic mail.

When an alert message is transmitted directly to the mobile phone or other email address of the friend or friends a reminder or recording notification is always also transmitted to the electronic program guide system of the friend or friends, such that the user of that electronic program guide system need not note down nor remember reminding/recording parameters, such as TV channel, start and stop times for the recommended program.

The particular protocol for transmitting the notification may be replaced by regular electronic mail.

The prompt message waiting for delayed confirmation of recording instruction or reminder registration may be transmitted to a mobile telephone of the user, for example, as an SMS or electronic mail. The user may then send a message back accepting or canceling the record instruction or reminder registration. A canceled record instruction for a program results in a reminder for that program.

A record instruction, both for a multimedia system of a user and for a multimedia system of a friend of the user, which is in conflict with a previous record instruction may, display a message indicating the previous record instruction and the present record instruction. The user is then given the possibility to either overwrite the previous record instruction or to cancel the present record instruction. If the user chooses to overwrite the previous record instruction it is preferably transformed into a reminder. If the user chooses to cancel the present record instruction it is preferably transformed into a reminder.

The present invention may be implemented as a computer program product stored on a computer readable storage medium, comprising computer readable program code means for causing a computer to perform the features described above.

Such a computer program product may be directly loadable into the internal memory of a digital computer comprising software code portions for performing the features described above when said product is run on a computer.

It will be obvious that the present invention may be varied in a plurality of ways. Such variations are not to be regarded as departure from the scope of the present invention. All such variations as would be obvious for a person skilled in the art are intended to be included within the scope of the present invention.

The invention claimed is:

1. An apparatus comprising:
   at least one processor; and
   at least one memory including computer program code for one or more programs,
   the at least one memory and the computer program code configured to, with the at least one processor, cause the apparatus to perform at least the following,
   receive electronic program guide data;
   determine to render selection options in an electronic program guide for content items scheduled to be available in the future;
   create a notification of a content item selected from said electronic program guide, said notification including a mobile alert flag for registering a mobile alert and a recording flag for registering a recording instruction;
   determine to transmit the notification of the selected content item to at least one remote electronic program guide system of another apparatus prior to the selected content item being available;
   wherein at the another apparatus, when the notification is passed, and the apparatus is authorized to register the recording instruction at the another apparatus,
      cause, at least in part, registration of the recording instruction in a memory of the another apparatus that is stored with an electronic program guide thereby recording the content item, and
      when the recording instruction conflicts with a previous recording instruction, cause, at least in part, conversion of either the previous recording instruction or the recording instruction into a reminder; and
   schedule an alert message of said selected content item to be transmitted as a message to a mobile handset at a time point that has a predetermined time period before the selected content item being available.

2. The apparatus as claimed in claim 1, wherein the another apparatus is a recording device or a mobile communication handset.

3. The apparatus as claimed in claim 1, wherein the another apparatus is caused to filter to pass the notification when the apparatus is authorized to send the notification.

4. The apparatus as claimed in claim 3, wherein the another apparatus is caused to:
   when the notification is passed, but the apparatus is not authorized to register the recording instruction at the another apparatus, delay the registration of the recording instruction until the recording instruction is either confirmed or cancelled.

5. The apparatus as claimed in claim 1, wherein said notification includes the recording flag and recording parameters for the content item selected.

6. The apparatus as claimed in claim 3, wherein the another apparatus is caused to:
   when the notification is passed, and the apparatus is authorized to register the mobile alert at the another apparatus, register the mobile alert in the memory of the another apparatus thereby reminding a user of the another apparatus the content item; and
   when the notification is passed, and the apparatus is not authorized to register the mobile alert at the another apparatus, delay the registration of the mobile alert until the mobile alert flag is either confirmed or cancelled.

7. The apparatus as claimed in claim 1, wherein said apparatus is incorporated in an integrated receiver decoder, a set-top box, a mobile handset, a television receiver, or a mobile display appliance.

8. A non-transitory computer-readable storage medium carrying one or more sequences of one or more instructions which, when executed by one or more processors, cause an apparatus to at least perform the following steps:
   receiving electronic program guide data;
   determining to render selection options in an electronic program guide for content items scheduled to be available in the future;
   creating a notification of a content item selected from said electronic program guide, said notification including a mobile alert flag for registering a mobile alert and a recording flag for registering a recording instruction;
   determining to transmit the notification of the selected content item to at least one remote electronic program guide system of another apparatus prior to the selected content item being available;
   wherein at the another apparatus, when the notification is passed, and the apparatus is authorized to register the recording instruction at the another apparatus,
      causing, at least in part, registration of the recording instruction in a memory of the another apparatus that is stored with an electronic program guide thereby recording the content item, and
      when the recording instruction conflicts with a previous recording instruction, causing, at least in part, conversion of either the previous recording instruction or the recording instruction into a reminder; and
   scheduling an alert message of said selected content item to be transmitted as a message to a mobile handset at a time point that has a predetermined time period before the selected content item being available.

9. A non-transitory computer-readable storage medium as claimed in claim 8, wherein the another apparatus is caused to perform:
   filtering to pass the notification when the apparatus is authorized to send the notification.

10. A non-transitory computer-readable storage medium as claimed in claim 8, wherein the another apparatus is caused to perform:
   receiving said notification as an electronic mail.

11. A non-transitory computer-readable storage medium as claimed in claim 9, wherein the another apparatus is caused to further perform:

when the notification is passed, and the apparatus is not authorized to register the recording instruction at the another apparatus, delaying the registration of the recording instruction until the recording instruction is either confirmed or cancelled.

12. A non-transitory computer-readable storage medium as claimed in claim 11, wherein the another apparatus is caused to perform:

sending the registered recording instruction to a recording device associated with said electronic program guide system before the content item starts.

13. A non-transitory computer-readable storage medium as claimed in claim 9, wherein the another apparatus is caused to perform:

when the notification is passed, and the apparatus is authorized to register the mobile alert at the another apparatus, registering the mobile alert in the memory of the another apparatus thereby reminding a user of the another apparatus the content item; and when the notification is passed, and the apparatus is not authorized to register the mobile alert at the another apparatus, delaying the registration of the mobile alert until the mobile alert flag is either confirmed or cancelled.

14. A non-transitory computer-readable storage medium as claimed in claim 8, wherein the apparatus is caused to further perform:

transmitting the notification of the content item selected from said electronic program guide to a plurality of remote electronic program guide systems.

15. A method comprising:

receiving at a first apparatus electronic program guide data;

determining to render at the first apparatus selection options in an electronic program guide for content items scheduled to be available in the future;

creating at the first apparatus a notification of a content item selected from said electronic program guide, said notification including a mobile alert flag for registering a mobile alert and a recording flag for registering a recording instruction;

determining to transmit the notification of the selected content item from the first apparatus to at least one remote electronic program guide system of a second apparatus prior to the selected content item being available;

wherein at the second apparatus, when the notification is passed, and the first apparatus is authorized to register the recording instruction at the second apparatus, causing, at least in part, registration of the recording instruction in a memory of the second apparatus that is stored with an electronic program guide thereby recording the content item, and when the recording instruction conflicts with a previous recording instruction, causing, at least in part, conversion of either the previous recording instruction or the recording instruction into a reminder; and scheduling an alert message of said selected content item to be transmitted as a message to a mobile handset at a time point that has a predetermined time period before the selected content item being available.

16. A method of claim 15, wherein the second apparatus is incorporated as a recording device or a mobile communication handset.

17. A method of claim 15, further comprising:

causing, at least in part, filtering at the second apparatus to pass the notification when the first apparatus is authorized to send the notification, when the notification is passed, and the first apparatus is not authorized to register the recording instruction at the second apparatus, delaying the registration of the recording instruction until the recording instruction is either confirmed or cancelled.

18. A method of claim 15, further comprising:

filtering at the second apparatus to pass the notification when the first apparatus is authorized to send the notification;

when the notification is passed, and the first apparatus is authorized to register the mobile alert at the second apparatus, registering the mobile alert in the memory of the second apparatus thereby reminding a user of the second apparatus about the content item; and when the notification is passed, but the first apparatus is not authorized to register the mobile alert at the second apparatus, delaying the registration of the mobile alert until the mobile alert flag is either confirmed or cancelled.

19. A method of claim 17, further comprising:

determining to transmit from the second apparatus to the mobile handset a prompt message querying whether the recording instruction is to be confirmed or cancelled; and receiving at the second apparatus a reply message indicating accepting or canceling the recording instruction.

20. A method of claim 19, further comprising:

when the record instruction is canceled via the reply message, converting the recording instruction into a reminder at the second apparatus.

21. An apparatus comprising:

at least one processor; and at least one memory including computer program code for one or more programs, the at least one memory and the computer program code configured to, with the at least one processor, cause the apparatus to perform at least the following, receive a notification of a content item in an electronic program guide from another apparatus: and filter to pass the notification when the another apparatus is authorized to send the notification;

wherein the passed notification contains a mobile alert flag, and when the another apparatus is authorized to register a mobile alert at the apparatus, schedule to transmit an alert message to a mobile phone at a time point that has a predetermined time period before the content item being available; and wherein the passed notification contains a recording flag, and when the another apparatus is authorized to register a recording instruction at the apparatus, determine to register the recording instruction in a memory of the apparatus that is stored with an electronic program guide thereby recording the content item, and when the recording instruction conflicts with a previous recording instruction, convert either the previous recording instruction or the recording instruction into a reminder.

22. An apparatus of claim 21, wherein the apparatus is caused to:
- when the notification is passed, and the another apparatus is not authorized to register a recording instruction at the apparatus, delay the registration of the recording instruction until the recording instruction is either confirmed or cancelled;
- when the notification is passed, and the another apparatus is authorized to register the mobile alert at the apparatus, register the mobile alert in the memory of the apparatus thereby reminding a user of the apparatus about the content item; and
- when the notification is passed, and the another apparatus is not authorized to register the mobile alert at the apparatus, delay the registration of the mobile alert until the mobile alert flag is either confirmed or cancelled.

23. A non-transitory computer-readable storage medium carrying one or more sequences of one or more instructions which, when executed by one or more processors, cause an apparatus to at least perform the following steps:
- receiving a notification of a content item in an electronic program guide from another apparatus; and
- filtering to pass the notification when the another apparatus is authorized to send the notification;
- wherein the passed notification contains a mobile alert flag, and when the another apparatus is authorized to register a mobile alert at the apparatus, scheduling to transmit an alert message to a mobile phone at a time point that has a predetermined time period before the content item being available; and
- wherein the passed notification contains a recording flag, and when the another apparatus is authorized to register a recording instruction at the apparatus,
  - (1) determining to register the recording instruction in a memory of the apparatus that is stored with an electronic program guide thereby recording the content item;
  - (2) when the recording instruction conflicts with a previous recording instruction, converting either the previous recording instruction or the recording instruction into a reminder.

24. A non-transitory computer-readable storage medium of claim 23, wherein the apparatus is caused to further perform:
- when the notification is passed, and the another apparatus is not authorized to register the recording instruction at the apparatus, delaying the registration of the recording instruction until the recording instruction is either confirmed or cancelled;
- when the notification is passed, and the another apparatus is authorized to register the mobile alert at the apparatus, registering the mobile alert in the memory of the apparatus thereby reminding a user of the apparatus about the content item; and
- when the notification is passed, and the another apparatus is not authorized to register the mobile alert at the apparatus, delaying the registration of the mobile alert until the mobile alert flag is either confirmed or cancelled.

25. A method comprising:
receiving at a first apparatus a notification of a content item in an electronic program guide from a second apparatus; and
filtering at the first apparatus to pass the notification when the second apparatus is authorized to send the notification;
wherein the passed notification contains a mobile alert flag, and when the second apparatus is authorized to register a mobile alert at the first apparatus, scheduling to transmit an alert message to a mobile phone at a time point that has a predetermined time period before the content item being available; and
wherein the passed notification contains a recording flag, and when the second apparatus is authorized to register a recording instruction at the first apparatus,
- determining to register the recording instruction in a memory of the first apparatus that is stored with an electronic program guide thereby recording the content item, and
- when the recording instruction conflicts with a previous recording instruction, converting either the previous recording instruction or the recording instruction into a reminder.

26. A method of claim 25, wherein the apparatus is caused to:
- when the notification is passed, and the second apparatus is not authorized to register the recording instruction at the first apparatus, delaying at the first apparatus the registration of the recording instruction until the recording instruction is either confirmed or cancelled;
- when the notification is passed, and the second apparatus is authorized to register the mobile alert at the first apparatus, registering at the first apparatus the mobile alert in the memory of the apparatus thereby reminding a user of the apparatus about the content item; and
- when the notification is passed, and the second apparatus is not authorized to register the mobile alert at the first apparatus, delaying at the first apparatus the registration of the mobile alert until the mobile alert flag is either confirmed or cancelled.

* * * * *